March 31, 1970     P. SUTER     3,503,204
GAS TURBINE POWER PLANT PROTECTIVE CIRCUIT
Filed July 29, 1968
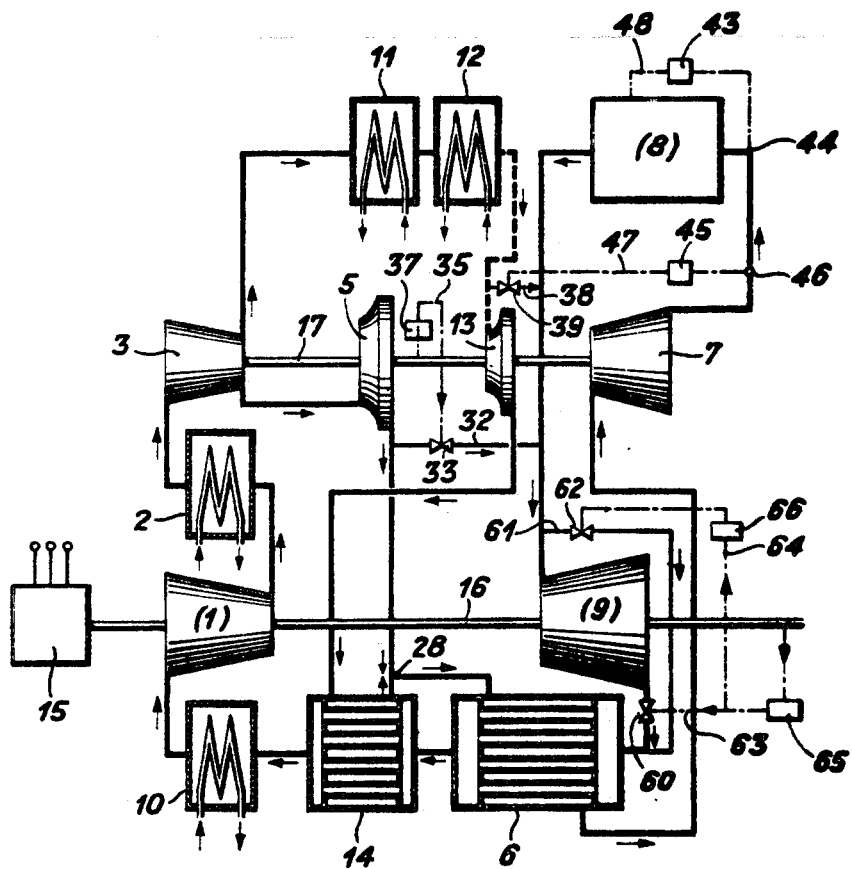
Inventor:
Peter Suter
BY Pennie, Edmonds,
Morton, Taylor and Adams
ATTORNEYS

United States Patent Office 3,503,204
Patented Mar. 31, 1970

3,503,204
GAS TURBINE POWER PLANT PROTECTIVE CIRCUIT
Peter Suter, Zurich, Switzerland, assignor to Sulzer Brothers Limited, Winterthur, Switzerland, a Swiss company
Filed July 29, 1968, Ser. No. 748,251
Claims priority, application Switzerland, July 27, 1967, 10,677/67
U.S. Cl. 60—36        3 Claims

ABSTRACT OF THE DISCLOSURE

There is disclosed a closed cycle $CO_2$ gas turbine power plant employing a nuclear reactor as a heat source, with high and low pressure turbines on separate shafts and with a bypass around the low pressure turbine and around a valve in series therewith, this valve being adjusted in accordance with low pressure shaft speed while a valve in the bypass is adjusted in accordance with low pressure shaft speed, but through a variable delay element.

---

The present invention pertains to closed cycle $CO_2$ gas turbine plants including high and low pressure turbines and compressors on separate shafts, with heating of the working substance in a nuclear reactor between the high and low pressure expansions, and intercooling between the low and high pressure compressions, the useful load being taken from the low pressure shaft. The invention provides means which protect such a power plant against run away speed in the event of a sudden drop in load.

It has been heretofore proposed to transform into electrical energy the heat energy of a nuclear reactor by means of a gas turbine plant having a closed cycle for the working substance thereof, the working substance serving as coolant in the reactor. Application to the working substance of the heat of the reactor is advantageously effected at a point in the cycle where the working substance is at an intermediate level of the range of pressures existing in the power plant, and more particularly at a point in the cycle where the working substance has undergone a preliminary expansion in the high pressure expansion stage of the power plant. In this way, it is possible to design the coolant channels passing through the reactor so that they have need to stand only moderate pressures.

It is an object of the invention to prevent destruction of the power plant upon a sudden removal of the load from the turbine which drives the load shaft, and especially to protect the reactor from excessive pressures and temperatures. In accordance with the invention there is provided a controllable throttling element at the outlet end of the low pressure turbine and also a bypass conduit around that low pressure turbine and the throttling element, this bypass having included therein a flow control device under the control of a delay element.

In the event of a drop in the load, the throttling device at the outlet of the low pressure expansion stage, which may be controlled in its setting by a tachometer on the low pressure shaft, produces a substantial rise in pressure, which may amount to one half of the available pressure. The result is that the power generated in this low pressure expansion stage suddenly will decline. With a controllable time delay, the bypass to the low pressure turbine is then opened so that the input pressure to that turbine will vary only to a relatively small degree, for example, within limits of 10%, notwithstanding the sharp increase in pressure downstream of that turbine. The result is that the nuclear reactor upstream of that turbine will also be protected from excessive pressures.

If the speed of rotation of the high pressure turbine is to be limited, it is advantageous to provide a short-circuiting line for the $CO_2$ between the outlet of the high pressure compressor and the inlet to the low pressure turbine, this short-circuiting line also including a flow control element or valve therein.

It has been proposed to construct $CO_2$ gas turbine plants so that a fraction of the working substance flowing therethrough is branched off from the main flow path, preferably at a point of high pressure, and then liquefied and cooled. In such a process, the liquefied medium is then desirably raised again in pressure, heated in a suitable exchanger such as a regenerator or heat recovery unit, and returned to the main flow cycle. In this way, the $CO_2$ flow circuit is made to approximate a Carnot cycle.

One simple means of holding the pressure of the $CO_2$ substantially constant within the reactor in such plants is to provide a line having a valve in it connected between the condensate line, upstream of the pressure increasing device therein, and the low pressure expansion stage. In this way, the condenser is connected to the output of the reactor, and the pressure in the condenser is substantially constant, or at least varies only slowly since it is controlled by the temperature of the cooling water therein.

BRIEF DESCRIPTION OF THE DRAWING

The invention will now be further described in terms of a non-limitative exemplary embodiment and by reference to the accompanying drawings in which the single figure of drawing is a diagrammatic representation of a $CO_2$ power plant in accordance with the invention having partial condensation of the working substance at a high pressure level, together with the pertinent control apparatus.

In the drawing, "lines" or pipes (i.e. conduits) carrying gaseous $CO_2$ are shown as single lines on the paper. Conduits carrying condensate are shown as dashed lines, while signal conduit are shown as dot-dash lines.

In the drawing, the low pressure compressor is shown at 1 mounted on a shaft 16 with the low pressure turbine 9. The compressor 1 draws cold expanded gas from the recooler 10 and raises it to an intermediate pressure. The gas passes from the compressor 1 through an intercooler 2, and through an intermediate level compressor 3 driven via shaft 17 from the high pressure turbine 7. The shaft 17 also carries a high pressure compressor 5 and a condensate pump 13. The pump 13 may however be disposed on the low pressure shaft instead. At the outlet of the intermediate pressure compressor 3, the gas stream is divided into two approximately equal parts. One part flows through the precooler 11 and condenser 12 to a pump 13 and is thereby brought to the maximum pressure in the system. The circuit may be so laid out that the condensate coming from the condenser 12 passes through its critical pressure on compression in the pump 13. From the pump 13, the condensate passes (to the right in the drawing) through a heat recovery unit 14 in which it is raised in temperature by the waste heat of the working substance coming from the low pressure turbine 9 (and flowing to the left in the drawing). The working substance thus delivered from the pump 13 and heated in the recovery unit 14 is rejoined at the junction point 28 with the other half of the working substance divided out at the outlet of the intermediate level compressor 3. This other half of the working substance flows directly from the compressor 3 to the high pressure compressor 5 where it is raised to its maximum pressure, and is then delivered to the junction point 28.

From the junction point 28, the complete gas flow passes through the heat recovery unit 6 (flowing to the right in the drawing) where it is heated by the working substance exhausted from the low pressure turbine 9. The working substance thus flowing to the right in the unit 6 then passes for partial expansion in the high pressure turbine 7.

The $CO_2$ working substance emerging from the high pressure turbine 7 is heated by passage through the nuclear reactor shown at 8 before being expanded down to starting pressure in the low pressure turbine 9, wherein the useful output power of the plant is generated. In its passage to the left in the drawing from turbine 9 through the heat recovery units 6 and 14 and through the cooler 10, the working substance is restored to its initial condition upstream of the low pressure compressor 1, at which point the cycle begins anew.

On passage of the working substance through the cooler 10, the intercooler 2, the pre-cooler 11 and the condenser 12, heat is removed from the system by means of a coolant such as water.

In accordance with the invention, a controllable throttling element or valve 60 is disposed in the flow cycle of the working substance downstream of the low pressure turbine 9. In addition, a line 61 containing a flow control device or valve 62 is provided as a bypass around the turbine 9 and its valve 60. Control of the valves 60 and 62 is effected via signal lines 63 and 64 in response to signals from a tachometer 65 on the low pressure shaft 16, the signal line 64 including a delay element 66 whose delay can be adjusted. The tachometer 65 may be replaced by an acceleration measuring device or by a load sensor on the generator 15.

As already indicated, the flow control device 60 is shifted in closing direction, in response to a signal on signal line 63, so as to produce a substantial increase in pressure at the outlet end of the turbine 9, whenever the speed of the shaft 16 rises to a specified value, or in the event of a specified acceleration of that shaft, or in the event of loss of load on the generator 15. This same signal operates, after a specified delay established by setting of the delay unit 66, on the flow control device 62 so as to hold at or below a desired limit the amount of pressure increase upstream of the turbine 9. In this way, the pressure change across the turbine 9 is limited and run away speed to the shaft 16 is avoided, excessive rise in pressure back at the reactor 8 being likewise avoided.

To prevent destruction by run away of machines on the high pressure shaft 17 a line 32 is provided, coupling the output of the high pressure compressor 5 with the input to the low pressure turbine 9. This line 32 includes a controllable throttling device 33 which is controlled by a signal line 35 from a tachometer and speed controller 37 on the high pressure shaft 17. When the speed of the shaft 17 increases beyond a limiting value, the valve 33 is opened, the opening increasing with increase of the measured speed of the shaft, and vice versa.

The line 38 having a flow control device 39 therein also serves to protect the reactor against excessive pressure. The flow control device 39 may take the form of an on-off valve. The input pressure to the reactor, measured at a point between the high pressure turbine 7 and the reactor input by means of a pressure measuring device 46, is employed to adjust the valve 39 in response to output signals developed by the pressure controller 45 and delivered to the valve by a signal line 47. As soon as valve 39 is open, the output of the reactor is connected for pressure equalization to the condenser 12. Inasmuch as the pressure in the condenser is substantially constant or at least only changes slowly, in view of its subjection to the temperature of the cooling water passing through the condenser, the pressure of the gas passing through the reactor can likewise be held substantially constant. Moreover, connection of the condenser to the main flow cycle of the working substance immediately downstream of the reactor 8 makes it possible to effect rapid adjustment of the temperature at the outlet of the reactor by injection of relatively cold liquefied condensate.

The temperature control circuit including elements 44, 43 and 48, operating for example on the control rods of the reactor, protects the reactor against excessive temperatures. For this control, the temperature measured in the temperature measuring device 44 is applied to the temperature controller 43, which may take the form of a thermostat, the output signal of the controller 43 being passed via the signal line 48 for adjustment of the position of the control rods in the reactor.

While the invention has been described hereinabove in terms of a presently preferred embodiment thereof, the invention itself is not limited thereto, but rather comprehends all modifications of and departures from that embodiment properly falling within the spirit and scope of the appended claims.

I claim:
1. A closed cycle gas turbine power plant including a high pressure turbine, a nuclear reactor, a low pressure turbine, a regenerator, a low pressure compressor coupled to the low pressure turbine and at least one higher pressure compressor coupled to the high pressure turbine all connected together in a closed cycle for flow of a gaseous working substance therethrough, means to detect a change in operation of said low pressure turbine, first adjustable flow control means responsive to said detecting means disposed downstream of the low pressure turbine, a bypass around the low pressure turbine and first flow control means, second adjustable flow control means in said bypass, and delay means coupling said second flow control means to said detecting means.

2. A power plant according to claim 1 further including a high pressure compressor, a bypass between the outlet of the high pressure compressor and the inlet to the low pressure turbine, and adjustable flow control means in said last-named bypass.

3. A power plant according to claim 1 further including a high pressure compressor connected between the intermediate pressure compressor and high pressure turbine, a condenser and pump connected in series with each other and in parallel with the high pressure compressor, conduit means connected between the outlet of the condenser and the inlet to the low pressure turbine, and flow control means in said conduit means.

References Cited
UNITED STATES PATENTS

| | | | |
|---|---|---|---|
| 2,203,731 | 6/1940 | Keller. | |
| 2,318,905 | 5/1943 | Traupel | 60—39.25 XR |
| 2,627,717 | 2/1953 | Waller | 60—39.25 XR |
| 2,697,492 | 12/1954 | Destival | 60—39.25 XR |
| 3,321,930 | 5/1967 | La Fleur. | |

MARTIN P. SCHWADRON, Primary Examiner
ROBERT R. BUNEVICH, Assistant Examiner

U.S. Cl. X.R.
60—39.25, 59